United States Patent Office 2,867,634
Patented Jan. 6, 1959

2,867,634

11-OXYGENATED 6-METHYL-PREGNADIENES

Frank H. Lincoln, Jr., Kalamazoo, and William P. Schneider and George B. Spero, Kalamazoo Township, Kalamazoo County, Mich., assignors to The Upjohn Company, Kalamazoo, Mich., a corporation of Michigan No Drawing. Application November 23, 1956
Serial No. 623,822

7 Claims. (Cl. 260—397.45)

The present invention relates to steroid compounds and is concerned with 6-hydrocarbyl substituted steroid compounds particularly with 6-methyl-11β,17α-dihydroxy-21-fluoro-1,4-pregnadiene-3,20-dione, the intermediate 6-methyl - 11β,17α-dihydroxy-21-iodo-1,4-pregnadiene-3,20-dione, 6-methyl-17α-hydroxy-21-fluoro-1,4 - pregnadiene-3,11,20-trione and a process for the production therefor.

The new compounds and the process of the present invention are illustratively represented by the following formulae:

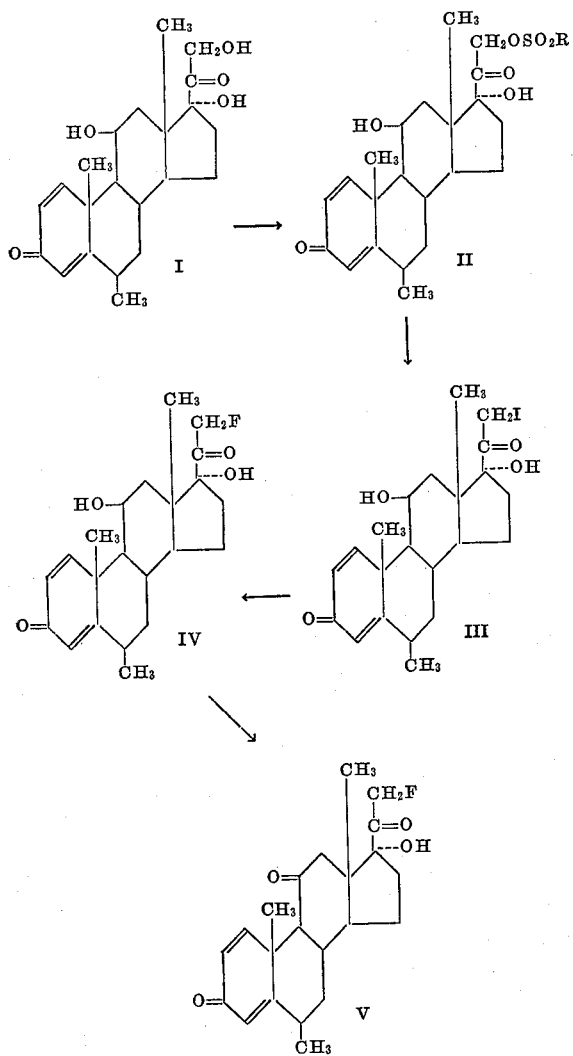

wherein R is an organic radical such as methyl, ethyl, phenyl, tolyl, naphthyl, or the like, with methyl preferred.

The process of the present invention comprises treating 6 - methyl - 11β,17α,21-trihydroxy-1,4-pregnadiene - 3,20- dione [1-dehydro-6-methylhydrocortisone (I)] with an organic sulfonyl halide such as methanesulfonyl chloride, toluenesulfonyl chloride, toluenesulfonyl bromide, benzenesulfonyl chloride, α- and β-naphthylsulfonyl chloride, or the like, to obtain the corresponding 21-ester, (II), a 21-alkyl- or 21-arylsulfonate of 6-methyl-11β,17α,21-trihydroxy-1,4-pregnadiene-3,20-dione; treating the thus produced 21-alkyl- or arylsulfonate of 6-methyl-11β,17α,21-trihydroxy-1,4-pregnadiene-3,20-dione with sodium iodide in acetone solution to obtain 6-methyl-11β,17α-dihydroxy-21-iodo-1,4-pregnadiene-3,20-dione (III); treating the thus obtained 6-methyl-11β,17α-dihydroxy-21-iodo-1,4-pregnadiene-3,20-dione with silver fluoride, preferably in acetonitrile solution, to obtain 6-methyl-11β,17α-dihydroxy-21-fluoro-1,4-pregnadiene-3,20-dione (IV) and if desired oxidizing the thus obtained 6-methyl-11β,17α-dihydroxy-21-fluoro-1,4-pregnadiene-3,20-dione with chromic anhydride, N-bromoacetamide, N-bromosuccinimide, or the like, to give 6-methyl-17α-hydroxy-21-fluoro-1,4-pregnadiene-3,11,20-trione (V).

It is an object of the instant invention to provide 6-methyl-11β,17α-dihydroxy-21-fluoro-1,4-pregnadiene-3,20-dione and 6-methyl-17α-hydroxy-21-fluoro-1,4-pregnadiene-3,11,20-trione and in particular the highly active 6α-epimers, 6α-methyl-11β,17α-dihydroxy - 21 - fluoro - 1,4-pregnadiene-3,20-dione and 6α-methyl-17α-hydroxy-21-fluoro-1,4-pregnadiene-3,11,20-trione. It is another object of the instant invention to provide a process for the preparation of 6-methyl-11β,17α-dihydroxy-21-fluoro-1,4-pregnadiene - 3,20 - dione, the intermediate 6 - methyl-11β,17α-dihydroxy-21-iodo-1,4-pregnadiene - 3,20 - dione and 6-methyl-17α-hydroxy - 21 - fluoro-1,4 - pregnadiene-3,11,20-trione especially in their 6α-epimeric form. Other objects of this invention will be apparent to those skilled in the art to which this invention pertains.

The novel 6α-methyl-11β,17α-dihydroxy-21-fluoro-1,4-pregnadiene-3,20-diones and the 6α-methyl-17α-hydroxy-21-fluoro-1,4-pregnadiene-3,11,20-triones possess a high order of physiological activity, and possess activity spectra different from the adrenalcortical hormones found in nature such as hydrocortisone and cortisone, especially in their effect on mineral and water metabolism. The compounds cause a loss of salt and water which makes them especially valuable in the management of chronic congestive heart failure and in the treatment of cirrhosis of the liver, the nephrotic syndrome and the treatment of eclampsia and preesclampsia. The novel synthetic corticosteroid hormones of the present invention possess also anti-inflammatory, glucocorticoid, anesthetic, uterine, ovarial and adrenal growth-depressional, and adrenal corticoid activity. The anti-inflammatory activity is notable in all the steroids of the present invention.

The novel 6-methyl-11β,17α-dihydroxy-21-fluoro-1,4-pregnadiene-3,20-diones and 6-methyl-17α-hydroxy-21-fluoro-1,4-pregnadiene-3,11,20-triones are useful in oral, parenteral and topical compositions. In oral compositions the material may be given as tablets illustratively using either polyethylene glycol 4000 or 6000 as a carrier or lactose and/or sucrose as diluent. Especially the novel 6α-methyl-11β,17α-dihydroxy-21-fluoro-1,4 - pregnadiene-3,20-dione and 6α-methyl-17α-hydroxy-21-fluoro-1,4-pregnadiene-3,11,20-trione are also useful for topical application as ointments, lotions, jellies, creams, suppositories, bougies, aqueous suspensions etc. Examples of advantageous topical preparations of suitable compositions are given below. While the examples below are to the 6α-methyl-11β,17α-dihydroxy-21-fluoro-1,4-pregnadiene-3,20-dione and 6α-methyl-11β,17α-dihydroxy-21-fluoro - 1,4-pregnadiene-3,11,20-trione, equivalent amounts of the 6β-pregnadiene-3,11,20-trione, equivalent amounts of the 6β-epimers and of other 6-lower-alkyl and 6-phenyl homologues of the compound of this invention are substitutable therein.

A dermatological and ophthalmic ointment has the following composition:

| | Lbs. |
|---|---|
| Wool fat, USP | 100 |
| Mineral oil, USP | 125 |
| 6α-methyl-11β,17α-dihydroxy-21-fluoro-1,4-pregnadiene-3,20-dione (micronized) | 5 |
| White petrolatum, USP | 500 |

In corporation of an antibiotic in the ointment, especially neomycin sulfate, has therapeutic advantages each active ingredient potentiating and supplementing the useful properties of the other. Such ointment is as follows:

| | Lbs. |
|---|---|
| Wool fat, at USP | 100 |
| Mineral oil USP | 125 |
| Neomycin sulfate | 3 |
| 6α - methyl - 11β,17α - dihydroxy - 21 - fluoro-1,4-pregnadiene-3,20-dione (micronized) | 2 |
| White petrolatum, USP | 500 |

In place of, or in addition to, neomycin sulfate, other antibiotics such bacitracin, circulin, polymyxin B sulfate, gramicidin, streptomycin sulfate, dihydrostreptomycin sulfate, oxytetracycline, chlorotetracycline, tetracycline, chloramphenicol and the sulfonamides can be used in conjunction with the steriods of the present invention for preparations such as the above ointments.

The compounds of the instant invention, 6α-methyl-11β,17α - dihydroxy-21 - fluoro - 1,4 - pregnadiene - 3,20-dione and 11-keto analogues thereof are also useful as starting materials for the preparation of other physiologically important compounds. For example, the 9α-halo analogues, especially 6α-methyl-9α,21-difluoro-11β,17α-dihydroxy-1,4-pregnadiene-3,20-dione and 6α-methyl-9α, 21 - difluoro - 17α - hydroxy - 1,4 - pregnadiene - 3,11, 20-trione can be prepared as shown in Examples 11 and 12. The halo derivatives, 6α-methyl-9α,21-difluoro-11β,17α-dihydroxy-1,4-pregnadiene-3,20-dione and 6α-methyl - 9α,21 - difluoro - 17α - hydroxy - 1,4 - pregnadiene-3,11,20-trione are compounds having glucorticoid and anti-inflammatory activity and may be used instead or with 6α - methyl - 11β,17α - dihydroxy - 21 - fluoro - 1,4-pregnadiene-3,20-dione and 6α-methyl-17α-hydroxy-21-fluoro-1,4-pregnadiene-3,11,20-trione in the above pharmaceutical compositions.

The starting compound of the instant invention is 1-dehydro-6α-methylhydrocortisone and 1-dehydro-6β-methyl-hydrocortisone or other 1-dehydro-6-alkyl or 1-dehydro-6-arylhydrocortisones prepared as shown in Preparations 1 through 12.

In carrying out the process of the instant invention 1-dehydro-6-methylhydrocortisone (6-methyl-11β,17α,21-trihydroxy-1,4-pregnadiene-3,20-dione) is treated with an acid halide of a sulfonic acid such as methanesulfonic acid, ethanesulfonic acid, propanesulfonic acid, benzenesulfonic acid, p-toluenesulfonic acid, α- or β-naphthanesulfonic acid, or the like with methanesulfonic acid haliides especially methanesulfonyl chloride preferred. The steroid is in the preferred embodiment of the instant invention reacted with the alkyl- or arylsulfonyl halide in solution such as in a solvent for example pyridine, benzene, toluene, or the like at a temperature between minus ten and plus thirty degrees centigrade providing that at the lower temperature the solvent has not solidified. Pyridine as solvent and a temperature between minus ten and plus ten is preferred. The time of reaction is usually between thirty minutes and six or eight hours after which the product, 6-methyl-11β,17α,21-trihydroxy-1,4-pregnadiene-3,20-dione 21-alkyl- or arylsulfonate is removed in conventional manner, for example, by evaporating the solvent until a dry residue is precipitated or by extracting the material from an aqueous solution. For extraction, solvents such as methylene chloride, chloroform, carbon tetrachloride, benzene, ether, toluene, or the like may be used. Removing the extraction solvent by distillation leaves the crude 6-methyl-11β,17α,21-trihydroxy-1,4-pregnadiene-3,20-dione 21-alkyl- or arylsulfonate.

For the purpose of producing the final product, it is unnecessary to purify the thus obtained 21-alkyl- or 21-arylsulfonate and the crude steroid sulfonate ester is used for the production of 6-methyl-11β,17α-dihydroxy-21-iodo-1,4-pregnadiene-3,20-dione.

The 21-iodo compound is prepared by reacting the 21-alkyl- or arylsulfonate of 11β,17α,21-trihydroxy-1,4-pregnadiene-3,20-dione with sodium or potassium iodide in acetone solution. A molar excess of sodium iodide (three to twenty moles of sodium iodide per one mole of steroid) is generaly preferred for this reaction and the reaction mixture containing 6-methyl-11β,17α,21-trihydroxy-1,4-pregnadiene-3,20-dione 21-alkyl- or arylsulfonate and the sodium iodide in acetone is heated to reflux for a period of three or four minutes to half an hour. The thus produced 6-methyl-11β,17α-dihydroxy-21-iodo-1,4-pregnadiene-3,20-dione is isolated by evaporating the solvent. For the subsequent reaction it is unnecessary to carefully purify the thus obtained 6-methyl-11β,17α-dihydroxy-21-iodo-1,4-pregnadiene-3,20 dione.

In order to obtain 6-methyl-11β,17α-dihydroxy-21-fluoro-1,4-pregnadiene-3,20-dione, the crude 6-methyl-11β,17α - dihydroxy - 21 - iodo - 1,4 - pregnadiene - 3,20-dione, dissolved in a suitable solvent such as acetonitrile, hexanes, heptanes, benzene, tertiary butyl alcohol, or the like with acetonitrile preferred, is reacted with silver fluoride. The reaction is usually carried out under exclusion of light and with stirring. The preferred form of silver fluoride used is a fifty percent aqueous silver fluoride solution rather than solid silver fluoride. The reaction is preferably carried out between forty to sixty degrees centigrade, however, lower or higher temperatures between ten and about 75 degrees centigrade are operative. Since the silver iodide produced in the reaction forms a molecular compound with silver fluoride, two moles of silver fluoride must be used per mole of steroid as the minimum amount necessary for theoretical recovery. However, it is preferred to use an even greater amount, between ten to fifty percent over and above the calculated amount, in order to obtain higher yields. The silver fluoride is generally added in portions over a period of time. The reaction time ranges usually from one half to six hours. In order to isolate the product the solvent is evaporated and the crude product extracted with a suitable solvent such as chloroform, methylene chloride, carbon tetrachloride, benzene, or the like. Purification is made by conventional procedures such as additional extraction to eliminate impurities, recrystallization or chromatography, as deemed necessary.

The oxidation of 6 - methyl - 11β,17α - dihydroxy - 21-fluoro-1,4-pregnadiene-3,20-dione is generally carried out in conventional manner such as, for example, oxidizing the 6-methyl-11β,17α-dihydroxy-21-fluoro - 1,4 - pregnadiene-3,20-dione in acetic acid solution with chromic anhydride using a calculated amount of chromic anhydride or a slight excess such as from ten to thirty percent excess of the calculated amount or oxidizing the 11β,17α-dihydroxy-21-fluoro-1,4-pregnadiene - 3,20 - dione with a haloamide or haloimide of an acid such as N-bromoacetamide, N-chlorosuccinimide, N-bromosuccinimide in pyridine, dioxane, or other solvent solutions. After termination of the oxidation, the oxidant is generally destroyed such as by addition of methyl alcohol, ethyl alcohol, when chromic acid was used or an alkali bisulfite when either chromic acid or N-bromosuccinimide and other N-haloacylamides were used. Thereafter, the product 6-methyl-17α-hydroxy - 21 - fluoro - 1,4 - pregnadiene-3,11,20-trione is obtained by conventional means such as extraction with water-immiscible solvents, for example, methylene chloride, ethylene chloride, chloroform, carbon tetrachloride, ether, benzene, toluene, or the like, or by chromatography, if deemed necessary.

The following preparations and examples are illustrative of the process and products of the present invention, but are not to be construed as limiting.

PREPARATION 1

*5α,6α-oxido-11β,17α,21-trihydroxyallopregnane-3,20-dione 3,20-bis-(ethylene ketal)*

To a solution of 0.901 gram of 11β,17α,21-trihydroxy-4-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gave an additional 279 milligrams of the high melting product. The high melting material, 5α,6α-oxido-11β,17α,21-trihydroxyallopregnane-3,20 - dione 3,20 - bis-(ethylene ketal) was three times recrystallized from acetone and methanol to give a pure product of melting point 263 to 268 degrees centigrade. Other eluate fractions of lower melting point contained the 5β,6β-isomer thereof.

PREPARATION 2

*5α,6α-oxido-17α,21-dihydroxypregnane-3,11,20-trione 3,20-bis-(1,2-propylene ketal)*

To a solution of one gram of 17α,21-dihydroxy-5-pregnene-3,11,20-trione 3,20-bis-(1,2-propylene ketal) [cortisone 3,20-bis-(1,2-propylene ketal)] in chloroform was added a solution of perbenzoic acid in chloroform and the resulting solution allowed to stand in a refrigerator and then at room temperature, following the procedure of Preparation 1. The reaction solution was washed, dried, and evaporated as in Preparation 1. Recrystallization from acetone followed by fractionation of the mother liquor on a column of acid washed alumina, using the technique of Preparation 1, yielded 5α,6α-oxido-17α,21-dihydroxyallopregnane-3,11,20-trione 3,20-bis-(1,2 - propylene ketal) and the 5β,6β-oxido isomer.

Using as starting material in Preparation 2 the more commonly available cortisone 3,20-bis-(ethylene ketal) gives the 5α,6α - oxido - 17α,21 - dihydroxyallopregnane-3,11,20-trione 3,20-bis-(ethylene ketal).

In the same manner as shown in Preparations 1 and 2, 5α,6α-oxido-11β,17α,21-trihydroxyallopregnane - 3,20 - dione 3,20-bis-(alkylene ketals) and 5α,6α-oxido-17α,21-dihydroxyallopregnane-3,11,20-trione 3,20-bis - (alkylene ketals) can be prepared by reacting cortisone or hydrocortisone diketals, wherein the ketal group has been formed by reacting the steroid 3,20-dione with glycols, such as ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 3

*5α,11β,17α,21-tetrahydroxy-6β-methylallopregnane-3,20-dione 3,20-bis-(ethylene ketal)*

A solution of 1.115 grams of 5α,6α-oxido-11β,17α,21-trihydroxyallopregnane-3,20-dione 3,20-bis - (ethylene ketal) in 165 milliliters of tetrahydrofuran (the tetrahydrofuran being dried through distillation over lithium aluminum hydride) was added dropwise to a solution of 95 milliliters of methyl magnesium bromide in ether (the magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave 5α,11β,17α,21-tetrahydroxy-6β-methylallopregnane - 3,20 - dione 3,20 - bis - (ethylene ketal) of melting point 228 to 233 degrees and rotation [α]$_D$ minus eleven degrees in chloroform.

*Analysis.*—Calcd. for $C_{26}H_{42}O_8$: C, 64.70; H, 8.77. Found: C, 64.29; H, 8.69.

PREPARATION 4

*5α,11β,17α,21 - tetrahydroxy-6β-ethylallopregnane-3,20-dione 3,20-bis-(ethylene ketal)*

In the same manner as shown in Preparation 3, 5α,6α-oxido - 11β,17α,21 - trihydroxyallopregnane - 3,20-dione 3,20-bis-(ethylene ketal), was reacted with ethyl magnesium bromide in ether solution to give the corresponding 5α,11β,17α,21 - tetrahydroxy - 6β-ethylallopregnane-3,20-dione 3,20-bis-(ethylene ketal).

In the same manner as shown in Preparations 3 and 4, other 5α,11β,17α,21-tetrahydroxy-6β-alkylallopregnane-3,20-dione 3,20-bis-(ethylene ketals) and 5α,17α,21-trihydroxy-6β-alkylallopregnane-3,11,20-trione 3,20-bis-(ethylene ketals) are prepared by reacting the corresponding 5α,6α - oxido-17α,21-dihydroxyallopregnane-3,20-dione 3,20-bis-(ethylene ketal) oxygenated in the 11-position with a metal alkyl or metal aryl more specifically an alkyl metal halide such as a Grignard reagent, for example, methyl, ethyl, propyl, isopropyl, butyl, pentyl, hexyl, and phenyl magnesium bromides and iodides or cadmium alkyl and calcium alkyl and phenyl bromides or iodides. Representative 6β-alkylated allopregnanes thus prepared include: 5α,11β,17α,21 - tetrahydroxy-6β-propylallopregnane-3,20-dione 3,20-bis-(ethylene ketal), 5α,11β,17α,21-tetrahydroxy-6β-butylallopregnane-3,20-dione 3,20-bis-(ethylene ketal), 5α,11β,17α,21-tetrahydroxy-6β-isobutylallopregnane-3,20-dione 3,20-bis-(ethylene ketal), 5α,11β,17α,21-tetrahydroxy - 6β-pentylallopregnane-3,20-dione 3,20-bis-(ethylene ketal), 5α,11β,17α,21-tetrahydroxy-6β-hexylallopregnane-3,20-dione 3,20-bis-(ethylene ketal), 5α,11β,17α,21-tetrahydroxy - 6β-phenylallopregnane-3,20-dione 3,20-bis-(ethylene ketal); 5α,17α,21 - trihydroxy-6β-methylallopregnane-3,11,20-trione 3,20-bis-(ethylene ketal), 5α,17α,21 - trihydroxy-6β-ethylallopregnane-3,11,20-trione 3,20-bis-(ethylene ketal), 5α,17α,21-trihydroxy-6β-propylallopregnane-3,11,20-trione 3,20-bis-(ethylene ketal), 5α,17α,21 - trihydroxy - 6β-isopropylallopregnane-3,11,20-trione 3,20-bis-(ethylene ketal), 5α,17α,21-trihydroxy-6β-butylallopregnane-3,11,20-trione 3,20-bis-(ethylene ketal), 5α, 17α,21 - trihydroxy-6β-pentylallopregnane-3,11,20-trione 3,20-bis-(ethylene ketal), 5α,17α,21-trihydroxy-6β-hexylallopregnane-3,11,20-trione 3,20-bis-(ethylene ketal), 5α,17α,21 - trihydroxy-6β-phenylallopregnane-3,11,20-trione 3,20-bis-(ethylene ketal), and the like.

PREPARATION 5

*5α,11β,17α,21 - tetrahydroxy-6β-methylallopregnane-3,20-dione*

A solution was prepared containing 468 milligrams of 5α,11β,17α,21 - tetrahydroxy-6β-methylallopregnane-3,20-dione 3,20-bis-(ethylene ketal), 38 milliliters of methanol and 7.7 milliliters of 2 N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters of volume. A product crystallized upon cooling and was recovered by filtration. This prodct was recrystallized from acetone Skellysolve B hexanes to give an analytical pure sample of 5α,11β,17α,21-tetrahydroxy-6β-methylallopregnane-3,20-dione of melting point 240 to 244 (decomposition) and rotation [α]$_D$ plus forty degrees in dioxane.

*Analysis.*—Calcd. for $C_{22}H_{34}O_6$: C, 66.98; H, 8.69. Found: C, 66.84; H, 8.86.

PREPARATION 6

*5α,11β,17α,21 - tetrahydroxy - 6β-ethylallopregnane-3,20-dione*

In the same manner as shown in Preparation 5, 5α,11β,17α,21 - tetrahydroxy-6β-ethylallopregnane-3,20-dione 3,20-bis-(ethylene ketal) was hydrolyzed with dilute sulfuric acid in ethanol solution to give 5α,11β,17α,21-tetrahydroxy-6β-ethylallopregnane-3,20-dione.

In the same manner as shown in Preparations 5 and 6, inclusive, hydrolysis of the 6β-alkylallopregnane diketals, such as the 5α,11β,17α,21-tetrahydroxy-6β-alkylallopregnane-3,20-dione 3,20-bis-(ethylene ketal), and 5α,17α,21-trihydroxy - 6β-alkylallopregnane-3,11,20-trione 3,20-bis-(ethylene ketal) as well as those 6β-alkylallopregnane-3,20-dione 3,20-bis-(ketals) wherein the ketal group is other than ethylene can be hydrolyzed to give the corresponding 5α,17α,21-trihydroxy-6β-alkylallopregnane-3,20-diones oxygenated in the 11-position, such as for example, 5α,11β,17α,21 - tetrahydroxy-6β-propylallopregnane-3,20-dione, 5α,11β,17α,21-tetrahydroxy-6β-butylallopregnane-3,20 - dione, 5α,11β,17α,21-tetrahydroxy-6β-isobutylallopregnane - 3,20 - dione, 5α,11β,17α,21-tetrahydroxy-6β-pentylallopregnane - 3,20-dione, 5α,11β,17α,21 - tetrahydroxy - 6β-hexylallopregnane-3,20-dione, 5α,11β,17α,21-tetrahydroxy - 6β-phenylallopregnane-3,20-dione, 5α,17α,21 - trihydroxy-6β-methylallopregnane-3,11,20-trione, 5α,17α,21 - trihydroxy-6β-ethylallopregnane-3,11,20-trione, 5α,17α,21 - trihydroxy - 6β-propylallopregnane-3,11,20-trione, 5α,17α,21 - trihydroxy-6β-isopropylallopregnane-3,11,20 - trione, 5α,17α,21 - trihydroxy-6β-butylallopregnane - 3,11,20-trione, 5α,17α,21-trihydroxy-6β-hexylallopregnane - 3,11,20-trione, 5α,17α,21-trihydroxy-6β-pentylallopregnane - 3,11,20 - trione, 5α,17α,21-trihydroxy - 6β-phenylallopregnane-3,11,20-trione, and the like, and including those 6β-alkylallopregnanes having ketal groups in position 3 and 20 such as exemplified in Preparation 2.

PREPARATION 7

*6α-methylhydrocortisone*

A stream of nitrogen was bubbled through a solution of 429 milligrams of 5α,11β,17α,21-tetrahydroxy-6β-methylallopregnane-3,20-dione contained in 100 milliliters of denatured absolute alcohol for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon acidified with acetic acid, and concentrated under reduced pressure at 55 degrees centigrade to dryness. The residue weighing 417 milligrams was recrystallized from acetone-Skellysolve B hexanes to give in two crops 249 milligrams of 6α-methylhydrocortisone melting between 184 and 194 degrees centigrade. An analytical sample was prepared melting at 203 to 208 degrees centigrade and consisting of pure 6α-methylhydrocortisone.

*Analysis.*—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, counter-current procedures and other means known in the art.

PREPARATION 8

*6β-methylhydrocortisone*

A solution was prepared containing 27.5 grams of 5α,11β,17α,21 - tetrahydroxy - 6β - methylallopregnane-3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220–223.

Recrystallization of the crude 6β-methylhydrocortisone three more times from ethyl acetate gave an analytical sample of 6β-methylhydrocortisone with melting point 223 to 227 degrees centigrade, rotation [α]$_D$ plus 105 degrees in acetone; ultraviolet absorption $$\lambda_{max.}^{95\% \text{ ethanol}}\ 243\ m\mu,\ a_M = 14{,}500$$

*Analysis.*—Calcd. for $C_{22}H_{32}O_5$: C, 70.17; H, 8.57. Found: C, 70.54; H, 8.91.

PREPARATION 9

*6α-ethylhydrocortisone*

In the same manner as shown in Preparation 7, 5α,11β,17α,21 - tetrahydroxy - 6β - ethylallopregnane-3,20-dione was treated with a solution of potassium hydroxide in methanol to give, at room temperature, 6α-ethylhydrocortisone of melting point 223–226 degrees centigrade and $$\lambda_{max.}^{EtOH}\ 243,\ \epsilon = 14{,}525$$

In the same manner dehydrating with an alkali metal hydroxide in alcoholic solution other 11-oxygenated 5α,17α,21-trihydroxy - 6β - alkylallopregnane-3,20-diones produced the corresponding 11-oxygenated 17α,21-dihydroxy-6α-alkyl-4-pregnene-3,20-diones such as 6α-propylhydrocortisone, 6α-butylhydrocortisone, 6α-isobutylhydrocortisone, 6α-pentylhydrocortisone, 6α-hexylhydrocortisone, or 6α-aryl analogues, such as 6α-phenylhydrocortisone, 6α-methylcortisone of melting point 212.5 to 215 degrees centigrade, 6α-ethylcortisone, 6α-propylcortisone, 6α-isopropylcortisone, 6α-butylcortisone, 6α-pentylcortisone, 6α-hexylcortisone, or a 6α-aryl analogue such as 6α-phenylcortisone, and the like.

PREPARATION 10

*1-dehydro-6α-methylhydrocortisone (6α-methyl-11β,17α, 21-trihydroxy-1,4-pregnadiene-3,20-dione)*

Six 100-milliliter portions of a medium in 250-milliliter Erlenmeyer flasks containing one percent glucose, two percent corn steep liquor (60 percent solids) and tap water was adjusted to a pH of 5.9. This medium was sterilized for 45 minutes at fifteen pounds per square inch pressure and inoculated with a one to two day growth of Septomyxa affinis ATCC 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 R. P. M.) and aerated (0.5 l. air/10 l. beer). After seventeen hours of incubation, when a good growth developed and the acidity rose to pH 6.7, two grams of 6α-methylhydrocortisone plus one gram of 3-ketobisnor-4-cholen-22-al, dissolved in 115 milliliters of dimethylformamide, was added and the incubation (conversion) carried out at the same temperature and aeration for 24 hours (final pH 7.9). The mycelium (56 grams dry weight) was filtered off and the steroidal material was extracted with methylene chloride, the methylene chloride extracts evaporated to dryness, and the resulting residue chromatographed over a Florisil column. The column was packed with 200 grams of Florisil and was developed with five 400-milliliter fractions each of methylene chloride, Skellysolve B hexanes-acetone mixtures of 9:1, 8:2, 7:3, 1:1, and methanol. The fraction eluted with Skellysolve B-acetone (7:3) weighed 1.545 and on recrystallization from acetone gave, in three crops, 928 milligrams of product of melting point 210–235 degrees. The sample of 1-dehydro-6α-methylhydrocortisone prepared for analysis melted at 245 to 247 degrees. Rotation $[\alpha]_D$ was plus 83 degrees, in dioxane.

*Analysis.*—Calcd. for $C_{22}H_{30}O_5$: C, 70.56; H, 8.08. Found: C, 70.53; H, 7.94.

$\lambda_{max.}^{EtOH}$ 243, $\epsilon = 14,875$

Infrared absorption in Nujol mineral oil suspension:

| | |
|---|---|
| OH | 3430  3330  3180 cm.$^{-1}$ |
| 20-keto | 1706 |
| Conjugated 3-keto | 1645 |
| $\Delta^{1,4}$-double bond | 1592 |

PREPARATION 11

*1-dehydro-6α-methylcortisone*

In the same manner given in Preparation 1, 6-methylcortisone was submitted to fermentation by Septomyxa affinis in the same nutrient medium with crude 11β,21-dihydroxy-4,17(20)-pregnadiene-3-one as promoters to give 1-dehydro-6α-methylcortisone of melting point 230 to 232 degrees centigrade.

Instead of the 11β,21-dihydroxy-4,17(20)-pregnadiene-3-one as promoter progesterone, 3-ketobisnor-4-cholen-22-al or 3-ketobisnor-4-cholenic acid may be used.

PREPARATION 12

*1-dehydro-6β-methylhydrocortisone*

In the same manner given in Preparation 9, fermenting with Septomyxa affinis in a nutrient medium with crude 11β,21-dihydroxy-4,17(20)-pregnadiene-3-one as promoter 6β-methylhydrocortisone yielded 1-dehydro-6β-methylhydrocortisone.

PREPARATION 13

In the same manner shown in Preparation 9, by fermentation with microorganisms of the genera Corynebacterium, Didymella, Calonectria, Alternaria, Colletotrichum, Cylindrocarpon, Ophiobolus, Septomyxa, Fusarium, Listeria, or Erysipelothrix:

(*a*) 6-ethylhydrocortisone (6α or 6β-epimers) yielded the corresponding 1-dehydro-6-ethylhydrocortisone.

(*b*) 6-propylhydrocortisone yielded 1-dehydro-6-propylhydrocortisone.

(*c*) 6-butylhydrocortisone yielded 1-dehydro-6-butylhydrocortisone.

(*d*) 6-hexylhydrocortisone yielded 1-dehydro-6-hexylhydrocortisone.

(*e*) 6-phenylhydrocortisone yielded 1-dehydro-6-phenylhydrocortisone.

(*f*) 6-ethylcortisone yielded 1-dehydro-6-ethylcortisone.

(*g*) 6-propylcortisone yielded 1-dehydro-6-propylcortisone.

(*h*) 6-valerylcortisone yielded 1-dehydro-6-valerylcortisone.

(*i*) 6-phenylcortisone yielded 1-dehydro-6-phenylcortisone.

In the same manner as shown in Preparations 11 and 12, other 1-dehydro-6-alkyl- and 1-dehydro-6-arylhydrocortisones and -cortisones are produced by subjecting the corresponding 6-alkylated or 6-arylated cortisone, or, respectively, hydrocortisone (6α or 6β-epimers) or the esters thereof to fermentation especially by Corynebacterium simplex or Septomyxa affinis in the absence or presence of steroidal promoters such as 3-ketobisnor-4-cholen-22-al, 3-ketobisnor-4-cholenic acid and progesterone. Representative 6-alkyl and 6-aryl-11-oxygenated-17α,21-dihydroxy-1,4-pregnadiene-3,20-diones thus produced include: 1-dehydro-6-valerylhydrocortisone, 1-dehydro-6-hexylhydrocortisone, 1-dehydro-6-isopropylcortisone, 1-dehydro-6-isobutylhydrocortisone, 1-dehydro-6-butylcortisone, 1-dehydro-6-hexylcortisone, 1-dehydro-6-isopropylhydrocortisone, 1-dehydro-6-pentylcortisone, 1-dehydro-6-isobutylcortisone, and the like.

EXAMPLE 1

*6α - methyl - 11β,17α,21 - trihydroxy - 1,4 - pregnadiene-3,20-dione 21-methanesulfonate (1-dehydro-6α-methylhydrocortisone 21-methanesulfonate)*

A solution was prepared containing 164 milligrams (0.437 millimole) of 1-dehydro-6α-methylhydrocortisone in one milliliter of pyridine. This solution was cooled to zero degrees centigrade and treated with a cooled solution of 75 milligrams of methanesulfonyl chloride in 0.5 milliliter of pyridine. Thereafter the solution was allowed to stand at a temperature between zero and five degrees centigrade for a period of two hours. Thereafter ice and sufficient dilute hydrochloric acid to neutralize the pyridine was added and the mixture extracted with three 25-milliliter portions of methylene chloride. The extracts were combined, washed with cold sodium bicarbonate solution, then water and finally dried over anhydrous sodium sulfate and evaporated at reduced pressure to give crystalline 6α-methyl-11β,17α,21-trihydroxy-1,4-pregnadiene-3,20-dione 21-methanesulfonate.

EXAMPLE 2

*6α - methyl - 11β,17α - dihydroxy - 21 - iodo - 1,4 - pregnadiene-3,20-dione*

The crystalline methanesulfonate of 6α-methyl-11β,17α,21-trihydroxy-1,4-pregnadiene-3,20-dione of Example 1 was dissolved in fifteen milliliters of acetone and treated with a solution of 200 milligrams of sodium iodide in five milliliters of acetone. The mixture was heated under reflux with stirring for a period of fifteen minutes. The heating was then discontinued and the mixture concentrated to dryness at reduced pressure to give 6α-methyl-11β,17α-dihydroxy-21-iodo-1,4-pregnadiene-3,20-dione.

EXAMPLE 3

6α - methyl - 11β,17α - dihydroxy - 21 - fluoro - 1,4-pregnadiene-3,20-dione

A solution of one gram of 6α-methyl-11β,17α-dihydroxy-21-iodo-1,4-pregnadiene-3,20-dione in 150 milliliters of acetonitrile (practical grade) was prepared by heating to the boiling point. After cooling to forty degrees centigrade the solution was protected from light and 0.8 milliliter of fifty percent aqueous solution of silver fluoride was added under stirring. The solution became cloudy and brown colored. Under continued stirring at a temperature between forty to 45 degrees centigrade, additional silver fluoride solution was added as two 0.7-milliliter portions, one hour apart. Heating and stirring was then continued for a period of two hours. The brown mixture was thereupon filtered through a bed of Celite diatomaceous earth and the filtrate evaporated at reduced pressure from a bath at a temperature of fifty degrees centigrade. The brown residue was thoroughly extracted with two one hundred-milliliter portions of warm methylene chloride, the methylene chloride extracts concentrated to approximately 100-milliliter volumes and chromatographed over fifty grams of Florisil synthetic magnesium silicate. Fractions of 200 milliliters were taken as follows:

| Fractions: | Solvent |
|---|---|
| 1–5 | Hexane-acetone 93:7. |
| 6–28 | Hexane-acetone 90:10. |
| 29 | Acetone. |

The hexane mixture used was Skellysolve B hexanes. Fractions 18 to 25 were combined and evaporated to give 470 milligrams of crystals which after recrystallization from acetone-Skellysolve B yielded 343 milligrams of 6α-methyl - 11β,17α - dihydroxy - 21 - fluoro - 1,4 - pregnadiene-3,20-dione of melting point 216 to 222 degrees centigrade.

Analysis.—Calcd. for $C_{22}H_{29}O_4F$: C, 70.18; H, 7.76; F, 5.05. Found: C, 70.43; H, 7.91; F, 3.78.

EXAMPLE 4

6α - methyl - 17α - hydroxy - 21 - fluoro - 1,4 - pregnadiene-3,11,20-trione

A mixture was prepared containing 0.3 gram of 6α-methyl - 11β,17α - dihydroxy - 21 - fluoro - 1,4 - pregnadiene-3,20-dione, 100 milligrams of chromic anhydride, ten milliliters of glacial acetic acid and one-half milliliter of water. This mixture was stirred and maintained at room temperature for eight hours. Thereafter the mixture was poured into fifty milliliters of ice water, neutralized by the addition of dilute sodium hydroxide and the thus obtained precipitate collected on a filter and recrystallized three times from ethyl acetate and Skellysolve B hexanes to give 6α-methyl-17α-hydroxy-21-fluoro-1,4-pregnadiene-3,11,20-trione.

EXAMPLE 5

6α - ethyl - 11β,17α,21 - trihydroxy - 1,4 - pregnadiene-3,20-dione 21-toluenesulfonate In the same manner given in Example 1, 1-dehydro-6α-ethylhydrocortisone, dissolved in pyridine, was treated with toluenesulfonyl chloride to give 6α-ethyl-11β,17α,21-trihydroxy - 1,4 - pregnadiene - 3,20 - dione 21 - toluenesulfonate.

EXAMPLE 6

6α - ethyl - 11β,17α - dihydroxy - 21 - iodo - 1,4 - pregnadiene-2,20-dione

In the same manner given in Example 2, refluxing 6α-ethyl - 11β,17α,21 - trihydroxy - 1,4 - pregnadiene - 3,20-dione 21-toluenesulfonate with sodium iodide in acetone yielded 6α-ethyl-11β,17α-dihydroxy-21-iodo-1,4-pregnadiene-3,20-dione.

EXAMPLE 7

6α-ethyl-11β,17α-dihydroxy-21-fluoro-1,4-pregnadiene-3,20-dione

In the same manner given in Example 3, refluxing 6α-ethyl - 11β,17α - dihydroxy - 21 - iodo - 1,4 - pregnadiene-3,20-dione, dissolved in acetonitrile, with aqueous silver fluoride solution, yielded 6α-ethyl-11β, 17α-dihydroxy-21-fluoro-1,4-pregnadiene-3,20-dione.

EXAMPLE 8

6α-ethyl-17α-hydroxy-21-fluoro-1,4-pregnadiene-3,11,20-trione

To 200 milligrams of 6α-ethyl-11β,17α-dihydroxy-21-fluoro-1,4-pregnadiene-3,20-dione in eight milliliters of methanol was added 0.2 milliliter of pyridine, 0.4 milliliter of water and 150 milligrams of N-bromoacetamide. The reaction mixture was kept at room temperature for a period of twenty hours and then 25 milliliters of dilute sodium sulfite solution was added to destroy excess N-bromoacetamide. The mixture was thereupon concentrated until copious crystallization occurred. The mixture was then cooled to zero degrees centigrade and kept at this temperature for a period of one hour, filtered and the thus obtained crystalline precipitate recrystallized from acetone-Skellysolve B hexane solution to yield pure 6α-ethyl-17α-hydroxy-21-fluoro-1,4-pregnadiene-3,11,20-trione.

EXAMPLE 9

6α-methyl-17α-hydroxy-21-fluoro-1,4-pregnadiene-3,11,20-trione

In the same manner shown in Example 1, treating 1-dehydro-6α-methylcortisone with methanesulfonyl chloride in pyridine solution yielded 6α-methyl-17α,21-dihydroxy - 1,4 - pregnadiene - 3,11,20 - trione 21 - methanesulfonate; refluxing in the manner given in Example 2, 6α - methyl - 17α,21 - dihydroxy - 1,4 - pregnadiene-3,11,20 - trione 21 - methanesulfonate with potassium iodide in acetone yielded 6α - methyl - 17α - hydroxy-21-iodo-1,4-pregnadiene-3,11,20-trione and reacting, as shown in Example 3, with silver fluoride in acetonitrile the 6α-methyl-17α-hydroxy-21-iodo-1,4-pregnadiene-3,11,20-trione yielded 6α-methyl-17α-hydroxy-21-fluoro-1,4-pregnadiene-3,11,20-trione.

EXAMPLE 10

In the same manner shown in Example 1, treating other 1-dehydro-6α-alkylhydrocortisones and 1-dehydro-6α-alkyl-cortisones with the chlorides or bromides of toluenesulfonic acid, methanesulfonic acid and other organic sulfonic acids, gives the corresponding 21-toluenesulfonate or, respectively, the 21-methanesulfonate, or the like, of the corresponding 1-dehydro-6α-alkylhydrocortisones, and 1-dehydro-6α-alkyl-cortisones wherein the alkyl group may be methyl, ethyl, propyl, ispropyl, butyl, isobutyl, pentyl, hexyl, or an aryl such as phenyl, or the like.

Treating the thus obtained 21-toluenesulfonate, 21-methanesulfonate or other 21-alkyl- or 21-arylsulfonates of 1-dehydro-6α-alkylhydrocortisone and 1-dehydro-6α-alkylcortisone with sodium or potassium iodide in acetone at elevated temperature, usually reflux temperature, yields the corresponding 21-iodo compound such as, for example, 6α - propyl - 11β,17α - dihydroxy - 21 - iodo - 1,4-pregnadiene-3,20-dione, 6α-isopropyl-11β,17α-dihydroxy-21-iodo-1,4-pregnadiene-3,20-dione, 6α-butyl-11β,17α-dihydroxy-21-iodo-1,4-pregnadiene-3,20-dione, 6α-isobutyl-11β,17α - dihydroxy - 21 - iodo - 1,4 - pregnadiene-3,20 - dione, 6α -pentyl - 11β,17α - dihydroxy - 21 - iodo - 1,4 - pregnadiene - 3,20 - dione, 6α -phenyl-11β,17α - dihydroxy - 21 - iodo - 1,4 - pregnadiene-3,20 - dione, 6α - methyl - 17α - hydroxy - 21 - iodo- 1,4 - pregnadiene - 3,11,20 - trione, 6α - ethyl - 17α-hydroxy - 21 - iodo - 1,4 - pregnadiene - 3,11,20 - trione, 6α - propyl - 17α - hydroxy - 21 - iodo - 1,4 - pregnadiene-3,11,20 - trione, 6α - isopropyl - 17α - hydroxy - 21 - iodo - 1,4 - pregnadiene - 3,11,20 - trione, 6α - butyl - 17α - hydroxy - 21 - iodo - 1,4 - pregnadiene - 3,11,20 - trione, 6α - isobutyl - 17α - hydroxy - 21 - iodo - 1,4 - pregnadiene - 3,11,20 - trione, 6α - pentyl - 17α - hydroxy - 21 - iodo - 1,4 - pregnadiene - 3,11,20 - trione, 6α - hexyl - 17α - hydroxy - 21 - iodo - 1,4 - pregnadiene - 3,11,20 - trione, 6α - phenyl - 17α - hydroxy - 21 - iodo - 1,4 - pregnadiene - 3,11,20 - trione, and the like.

Treating as shown in Example 3 at reflux temperature the thus prepared 21-iodo compounds in acetonitrile with aqueous silver fluoride yields the corresponding 21-fluoro compound such as: 6α-propyl-11β,17α-dihydroxy-21-fluoro - 1,4 - pregnadiene - 3,20 - dione, 6α - isopropyl - 11β,17α - dihydroxy - 21 - fluoro - 1,4 - pregnadiene - 3,20 - dione, 6α - butyl - 11β,17α - dihydroxy - 21 - fluoro - 1,4 - pregnadiene - 3,20 - dione, 6α - isobutyl - 11β,17α - dihydroxy - 21 - fluoro - 1,4 - pregnadiene - 3,20 - dione, 6α - pentyl - 11β,17α - dihydroxy - 21 - fluoro - 1,4 - pregnadiene - 3,20 - dione, 6α phenyl - 11β,17α - dihydroxy - 21 - fluoro - 1,4 - pregnadiene - 3,20 - dione, 6α - methyl - 17α - hydroxy - 21 - fluoro-1,4 - pregnadiene - 3,11,20 - trione, 6α - ethyl - 17α - hydroxy - 21 - fluoro - 1,4 - pregnadiene - 3,11,20 - trione, 6α - propyl - 17α - hydroxy - 21 - fluoro - 1,4 - pregnadiene - 3,11,20 - trione, 6α - isopropyl - 17α - hydroxy - 21 - fluoro - 1,4 - pregnadiene - 3,11,20 - trione, 6α - butyl - 17α -hydroxy - 21 - fluoro - 1,4 - pregnadiene - 3,11,20 - trione, 6α - isobutyl - 17α - hydroxy - 21 - fluoro-1,4 - pregnadiene - 3,11,20 - trione, 6α - pentyl - 17α - hydroxy - 21 - fluoro - 1,4 - pregnadiene-3,11,20-trione, 6α-hexyl-17α-hydroxy - 21 - fluoro-1,4-pregnadiene-3,11,20-trione, 6α-phenyl-17α-hydroxy-21-fluoro-1,4-pregnadiene-3,11,20-trione, and the like.

Instead of the 1-dehydro-6α-methylhydrocortisone or -cortisone, the 6β-epimers can be used in the above examples and if the conditions are kept near neutral, the 6β-epimers, such as 6β-methyl-11β,17α-dihydroxy-21-fluoro - 1,4 - pregnadiene - 3,20 - dione and 6β - methyl - 17α-hydroxy-21-fluoro-1,4-pregnadiene-3,11,20-trione, can be isolated from the reaction mixture. The thus obtained β-epimers yield the 6α-epimers by treatment with acid or base in an organic solvent, e. g., ethanol at room temperature.

EXAMPLE 11

*6α-methyl-9α,21-difluoro-11β,17α-dihydroxy-1,4-pregnadiene-3,20-dione*

A mixture of one gram of 6α-methyl-11β,17α-dihydroxy - 21 - fluoro - 1,4 - pregnadiene - 3,20 - dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystalization from acetone there was obtained about 0.7 gram of 6α - methyl - 17α - hydroxy - 21 - fluoro - 1,4,9(11)-pregnatriene-3,20-dione.

0.5 gram of 6α-methyl-17α-hydroxy-21-fluoro-1,4,9 (11)-pregnatriene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo-11β,17α-dihydroxy-21-fluoro-1,4-pregnadiene-3,20-dione.

A mixture of 0.45 gram of 6α-methyl-9α-bromo-11β, 17α-dihydroxy-21-fluoro-1,4-pregnadiene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α-methl-9(11)-oxido-17α-hydroxy-21-fluoro-1,4-pregnadiene-3,20-dione.

A solution of one gram of 6α-methyl-9(11)-oxido-17α-hydroxy-21-fluoro-1,4-pregnadiene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate, and then poured over a column of 100 grams of Florisil synthetic magnesium silicate. The column was developed with Skellsolve B hexanes and acetone, the fractions containing ten percent acetone were recrystallized from acetone and Skellysolve B hexanes to give pure 6α-methyl-9α,21-difluoro-11β,17α-dihydroxy-1,4-pregnadiene-3,20-dione.

Following the procedure described in Example 11, but substituting other 6α-alkyl-11β,17α-dihydroxy-21-fluoro-1,4-pregnadiene-3,20-diones for the 6α-methyl-11β,17α-dihydroxy-21-fluoro-1,4-pregnadiene - 3,20 - dione wherein the alkyl radical is ethyl, propyl, isopropyl, butyl, isobutyl, pentyl, hexyl, or an aryl radical such as phenyl, or the like, results in the corresponding 6α-alkyl-9α,21-difluoro-11β,17α-dihydroxy-1,4-pregnadiene - 3,20 - dione wherein the alkyl group will be ethyl, propyl, isopropyl, butyl, isobutyl, pentyl, hexyl, or an aryl such as phenyl, or the like.

EXAMPLE 12

*6α - methyl-9α,21-difluoro-17α-hydroxy-1,4-pregnadiene-3, 11,20-trione*

Oxidizing in the manner given in Example 8, 6α-methyl-9α,21 - difluoro - 11β,17α-dihydroxy-1,4-pregnadiene-3,20-dione with N-bromoacetamide in pyridine solution produces 6α - methyl-9α,21-difluoro-17α-hydroxy-1,4-pregnadiene-3,11,20-trione.

In the manner similar to Example 12, oxidizing with N-bromoacetamide in pyridine solution or according to Example 4 with chromic anhydride in acetic acid solution, other 6α-alkyl-9α,21-difluoro-11β,17α-dihydroxy-1,4-pregnadiene-3,20-dione results in the corresponding 6α-alkyl-9α,21-difluoro-17α-hydroxy-1,4-pregnadiene-3,11,20-triones wherein the alkyl group is ethyl, propyl, isopropyl, butyl, isobutyl, pentyl, hexyl, or an aryl, such as phenyl, or the like.

This application is a continuation-in-part of copending application S. N. 608,664, filed September 10, 1956.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. A compound from the group consisting of 6-methyl-11β,17α-dihydroxy-21-fluoro-1,4-pregnadiene-3,20-dione and 6-methyl-17α-hydroxy-21-fluoro-1,4-pregnadiene-3,11,20-trione.

2. 6-methyl-11β,17α-dihydroxy-21-fluoro-1,4-pregnadiene-3,20-dione.

3. 6α-methyl-11β,17α-dihydroxy-21-fluoro-1,4-pregnadiene-3,20-dione.

4. 6-methyl-17α-hydroxy-21-fluoro-1,4-pregnadiene-3,11,20-trione.

5. 6α-methyl-17α-hydroxy-21-fluoro-1,4-pregnadiene-3,11,20-trione.

6. 6-methyl-11β,17α-dihydroxy-21-iodo-1,4-pregnadiene-3,20-dione.

7. 6α-methyl-11β,17α-dihydroxy-21-iodo-1,4-pregnadiene-3,20-dione.

References Cited in the file of this patent

UNITED STATES PATENTS

| | | |
|---|---|---|
| 2,684,968 | Bergstrom | July 27, 1954 |
| 2,752,369 | Holysz et al. | June 26, 1956 |
| 2,756,179 | Fried | July 24, 1956 |
| 2,767,199 | Djerassi | Oct. 16, 1956 |
| 2,768,189 | Nomine | Oct. 23, 1956 |
| 2,768,191 | Warnant | Oct. 23, 1956 |
| 2,786,857 | Cutler | Mar. 26, 1957 |

OTHER REFERENCES

Tannhauser et al.: J. Am. Chem. 78, 2658–2659, June 5, 1956.

UNITED STATES PATENT OFFICE

Certificate of Correction

Patent No. 2,867,634                                                               January 6, 1959

Frank H. Lincoln, Jr., et al.

It is hereby certified that error appears in the printed specification of the above numbered patent requiring correction and that the said Letters Patent should read as corrected below.

Column 3, line 22, for "such bacitracin" read —such as bacitracin—; line 27, for "steriods" read —steroids—; column 4, line 15, for "generaly" read —generally—; column 7, line 19, for "prodct" read —product—; column 11, line 72, in the heading, for "-*2,20-dione*" read — -*3,20-dione*—; column 13, line 23, for "6α phenyl-" read —6α-phenyl- —; column 14, line 20, for "6α-methl-" read —6α-methyl- —; line 33, for "Skellsolve" read —Skellysolve—; column 15, line 2, for "compound from the group" read —compound selected from the group—.

Signed and sealed this 21st day of July 1959.

[SEAL]

Attest:
KARL H. AXLINE,
*Attesting Officer.*

ROBERT C. WATSON,
*Commissioner of Patents.*